Z. R. PERCEFULL.
Plow.

No. 229,455.          Patented June 29, 1880.

WITNESSES:
W. W. Hollingsworth
Edw. W. Byrn.

INVENTOR:
Z. R. Percefull
BY
ATTORNEYS.

UNITED STATES PATENT OFFICE.

ZEADOCK R. PERCEFULL, OF FORT SMITH, ARKANSAS, ASSIGNOR OF ONE-HALF OF HIS RIGHT TO THOMAS LANIGAN, OF SAME PLACE.

PLOW.

SPECIFICATION forming part of Letters Patent No. 229,455, dated June 29, 1880.

Application filed January 24, 1880.

*To all whom it may concern:*

Be it known that I, ZEADOCK R. PERCEFULL, of Forth Smith, in the county of Sebastian and State of Arkansas, have invented a new and useful Improvement in Plows; and I do hereby declare the following to be a full, clear, and exact description of the same, reference being had to the accompanying drawings, forming a part of this specification, in which—

Figure 1:
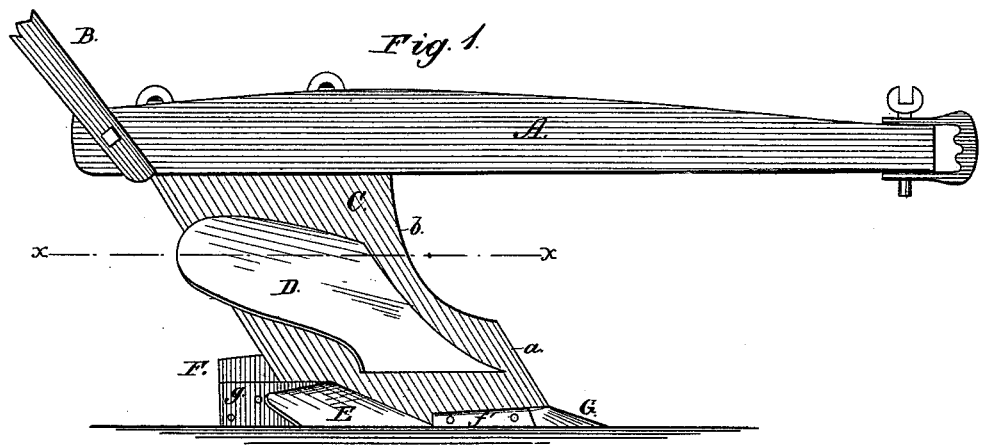
Figure 2:
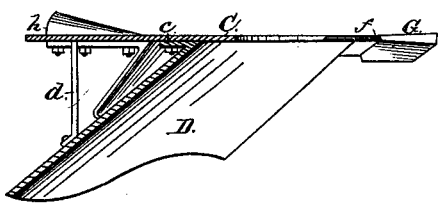
Figure 3:
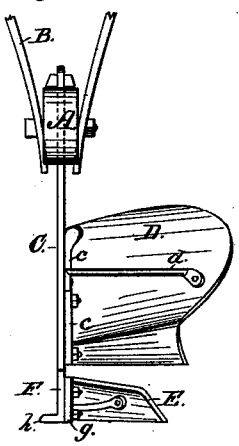
Figure 4:
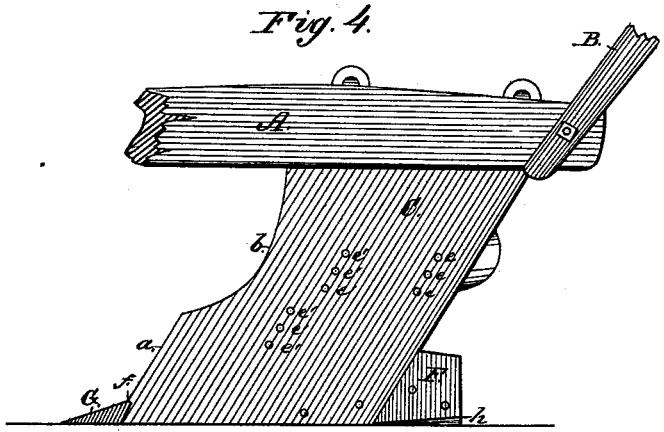

Figure 1 is a side elevation from the mold-board side. Fig. 2 is a horizontal section through line $x \, x$, Fig. 1. Fig. 3 is a rear elevation, and Fig. 4 is a side elevation from the landside side.

My invention relates to a combined mold-board or turn-plow and subsoiler; and it consists in a vertical standard-blade having a mold-board adjustably fixed thereto on its side, and carrying at its bottom a point in advance of the mold-board, and just in rear of this a share and heel-piece, by which arrangement the furrow is turned by the mold-bold, the earth pierced in advance of the mold-board by the subsoil-point, and then broken by the share in the rear, the adjustable connection of the mold-board affording means for regulating the relative depth of the furrow and subsoil-track, as hereinafter fully described.

In the drawings, A represents the beam, and B the handles, of my improved plow. C is a wide vertical blade, forming a standard, which is strongly connected to the beam by any suitable means, and extends to the full depth of the subsoiling-point. The forward edge of the blade C is made straight and inclined at $a$ and curved inwardly at $b$, and its straight edge $a$ is sharpened so as to act as a colter for the mold-board. D is said mold-board, which is adjustably fastened to the side of the blade C, so as to be raised or lowered in an oblique direction, being raised when deeper subsoiling or a shallower furrow is required, and vice versa.

For connecting the mold-board to the blade it is formed along its forward curved edge with a flange, $c$, through which bolts pass to secure it to the blade, while its wing or outer portion is braced by an arm, $d$, extending inwardly to the blade C, and also bolted thereto. The holes $e \, e \, e$ afford places for the different adjustment of the bolts of the arm $d$ in raising or lowering the mold-board, and holes $e' \, e' \, e'$ afford corresponding places for the adjustment of the bolts passing through the flange of the mold-board.

At the forward and lower end of the standard-blade, and in advance of the mold-board, is secured the subsoil-point G, which is formed with an undercut shoulder at $f$, to catch around the forward edge of the blade C, and a long shank, $f'$, which is bolted to the lower horizontal edge of the same. Just in rear of the point is arranged the share E for breaking the subsoil.

The shank-piece $g$ of the share is bolted to the lower rear side of the standard-blade, and carries a heel-piece, F, which is flush with the standard-blade on the landside, and which heel-piece has a sloping blade or foot, $h$, which projects horizontally on the landside and serves to steady the plow. The share itself projects at an angle from the blade and is braced by an arm, while its forward edge or point enters a notch in the rear end of the shank of the point G.

In the arrangement of the parts of the plow it will be seen that the space between the point of the mold-board and the subsoil-point and share gradually increases from the front to the rear. This gives a continually-increasing space to the rear for the earth raised by the subsoiling-share, giving clearance to the same and lightening the draft of the plow.

In plowing the ground can be turned heavy or light against the corn, and at the same time the soil may be loosened as deep as desired. The plow can be made to run as close as desired to the corn, and the earth can be either turned to the corn or not. In plowing corn it loosens the subsoil, so as to give the roots a chance to take hold in loose soil. In plowing grain it has the same advantage, the grain being planted between the subsoil raised and loosened and the loose earth of the turned furrow.

Having thus fully described my invention, what I claim is—

The combination of the vertical standard-blade C, the detachable and adjustable mold-board D, fixed to the side thereof, the point G, arranged in advance of the point of the mold-board, and the share E, arranged in rear of the same, substantially as described.

ZEADOCK R. PERCEFULL.

Witnesses:
JAS. H. HAMILTON,
JNO. DODSON.